Aug. 10, 1937.  C. H. SEIFERT  2,089,582
ROTARY VALVE PACKING
Filed May 4, 1936
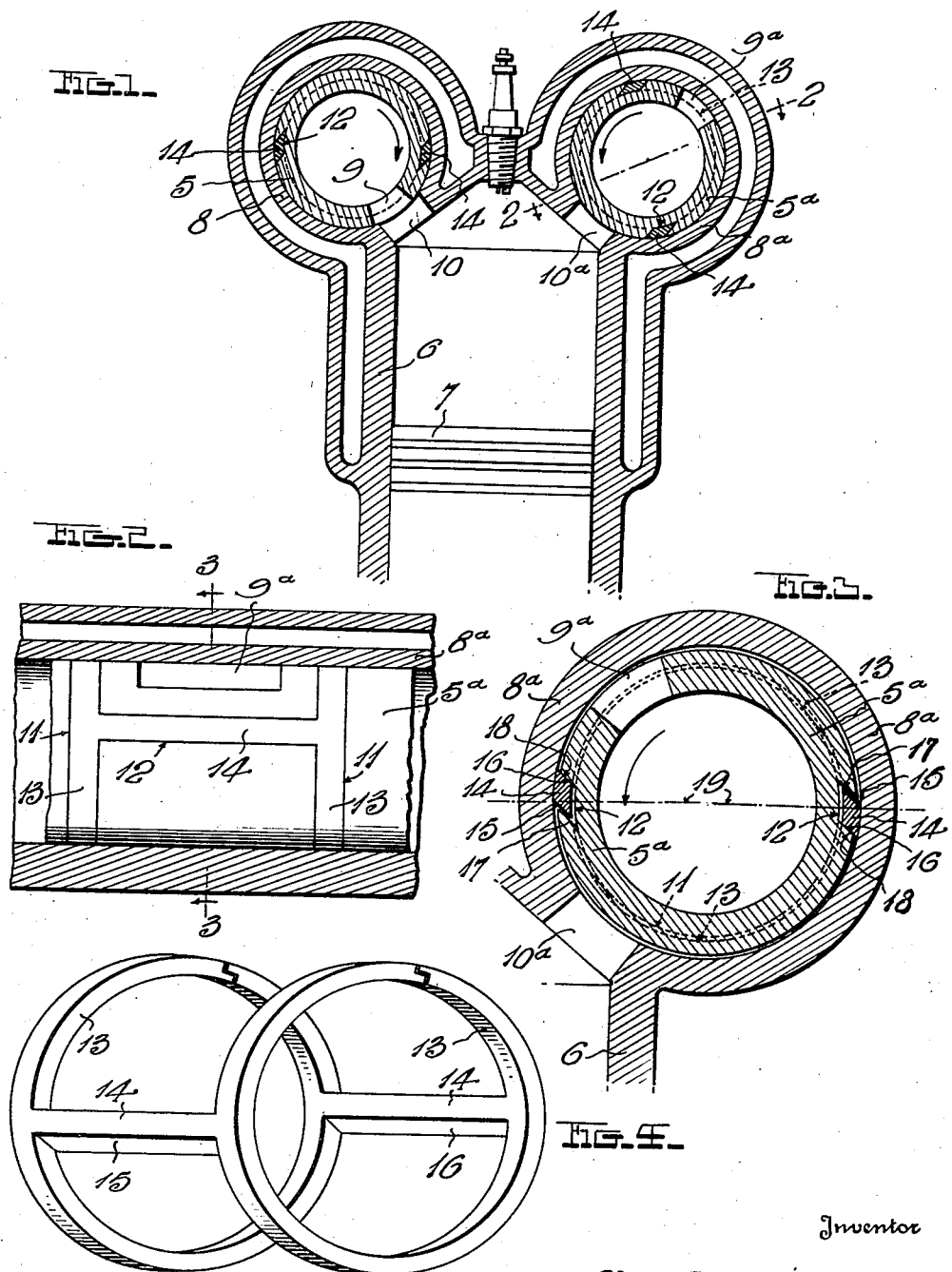
Inventor
Charles H. Seifert
By H. B. Wilson & Co.
Attorneys Patented Aug. 10, 1937

2,089,582

UNITED STATES PATENT OFFICE 2,089,582

ROTARY VALVE PACKING

Charles H. Seifert, Hempstead, N. Y.

Application May 4, 1936, Serial No. 77,896

4 Claims. (Cl. 123—190)

The invention relates to machines having rotary valves, and while an internal combustion engine is shown having two rotary valves, it is to be understood that the invention is equally adaptable to engines of other types, and to pumps and compressors, regardless of the number of valves used.

The object of the invention is to provide a new and improved packing to prevent leakage between the rotary valve and the cylindrical casing in which it operates, in any direction from a casing port which coacts with a valve port. In carrying out this end, two transversely split rings are mounted in circumferential grooves at opposite sides of the valve port, ring-connecting bars are mounted in longitudinal grooves in the periphery of the valve, and contacting sides of said longitudinal grooves and bars are disposed obliquely to radial lines, in such manner that they tend to outwardly crowd the bars and rings into tight sealing contact with the casing during rotation of the valve in the intended direction.

Fig. 1 is a sectional view through a portion of an internal combustion engine including one rotary valve for intake purposes and one for exhaust, both valves being provided with the improved packing.

Fig. 2 is a detail sectional view on line 2—2 of Fig. 1, the valve of the packing however, being shown in elevation.

Fig. 3 is an exaggerated transverse sectional view substantially on line 3—3 of Fig. 2 more clearly illustrating the manner in which the packing is crowded outwardly against the casing by rotation of the valves.

Fig. 4 is a perspective view of the packing detached from the valves.

The improved packing is shown, in the present disclosure, upon both a rotary intake valve 5 and a rotary exhaust valve 5ª for an internal combustion engine, part of the cylinder being shown at 6 and the piston at 7. Cylindrical casings 8 and 8ª are provided for the valves 5 and 5ª respectively, said intake valve 5 and casing 8 having coacting ports 9 and 10 and the exhaust valve and casing being provided with similar ports 9ª and 10ª. The function of the improved packing is to prevent possible leakage from the port 10 to the port 9 after closing of the latter, and to prevent leakage from the port 10ª to the port 9ª before the latter opens, and with the exception of obvious differences, the packings for the two valves are the same, so that a description in connection with the exhaust valve 5ª whose packing has been shown in detail, will suffice.

The valve 5ª is provided with two circumferential ring grooves 11 at opposite sides of its port 9ª, said valve being provided also with at least two longitudinal grooves 12 which connect said grooves 11, each of said grooves having flat parallel sides. Two circumferentially split metal rings 13 are snugly received in the grooves 11, and ring-connecting bars 14, corresponding in number to the grooves 12, are snugly seated in these grooves, said bars 14 being integral with or otherwise appropriately joined to the rings 13. In the present disclosure, only two of the bars 14 and a corresponding number of the grooves 12 have been shown, but more could be employed if desired. For purposes of explanation, the leading side of each bar 14 has been given the reference character 15, and the trailing side of said bar has been identified at 16. Similarly, 17 and 18 denote the leading side and the trailing side of each groove 12. At least the trailing side 16 of each bar 14 and the contacting groove side 18, are oblique to a radial line 19 extending through the bar and groove, the obliqueness being in such a direction as to cause said sides 16 and 18 to crowd the bar 14 away from the center of the valve during rotation of the latter in the intended direction. In thus outwardly crowding the bars 14, tight sealing contact between these bars and the casing 8ª is insured, and since the ends of the bars 14 are joined to the rings 13, said bars expand said rings to insure tight sealing contact with the casing. Preferably, the leading sides 15 and 17 of each bar 14 and its receiving groove 12, are also oblique to the radial line 19 and parallel with the sides 16 and 18.

The slight space shown between the valve 5ª and cylinder 8ª in Fig. 3 is, of course, exaggerated, as in actual practice nothing but clearance exists. The space illustrated in the same view between the bar side 15 and the groove side 17, does not really exist but is shown for illustrative purposes to more forcibly accentuate the manner in which the groove side 18 presses against the bar side 16 to create the radial pressure on said bar.

The direction in which the groove and bar sides are pitched, of course, depends upon the direction in which the valve must rotate. Furthermore, the exact relation of the longitudinal grooves with the valve port, depends upon whether the principal sealing is to be effected before opening of said port, or after opening thereof. Obviously, in the case of the intake valve, one of the longitudinal sealing bars such as 14, should closely follow said port to prevent escape of compression immediately after the intake valve closes. Similarly, one of the sealing bars should be near the leading end of the exhaust port 9ª to seal up to the time at which said port should open. During compression, no gas whatever from the port 10 can reach the port 9 and the same is true during firing of the charge. It is also true that during both compression and firing, no gas can reach the port 9ª from the port 10ª.

I am aware that packings have heretofore been provided having two rings connected by bars, but the present invention is distinct therefrom due to the improved feature thereof which forces the ring-connecting bars and the rings into tight sealing contact with the cylinder. In this connection, it may be explained that the entire packing unit shown in Fig. 4, being driven totally by the valve, has a tendency to remain stationary or resist the driving action, and in overcoming the resistance, the contacting sides 16 and 18 of the bars and grooves 14 and 12 respectively, effect the desired outward thrust. The extent of this thrust may, of course, be varied by constructing the bars 14 and grooves 12 with coacting sides more oblique or less oblique to the line 19, according to the requirements of the particular machine upon which the valve is used.

For illustrative purposes, I have shown only a portion of the valve 5ª for coaction with one cylinder of an engine, but obviously, said valve might be elongated and so ported as to serve a plurality of cylinders, and the same is true of the valve 5. Moreover, as the present invention relates solely to a novel way of packing a rotary valve, it is obvious that said invention is not restricted to details of valve structure, valve-driving means, etc., and obviously any desired provision could be made for obtaining the desired lubrication.

Preferably, the splits between the ends of the rings 13 are disposed at the side of the valve having the port 9ª, to better seal against leakage on compression and power strokes.

I claim:—

1. In an assemblage of the class described, a cylindrical valve casing, a rotary valve in said casing, two expansible packing rings surrounding said valve, at least two circumferentially spaced longitudinal packing bars extending between and secured at their ends to said packing rings, said valve being grooved to receive said rings and bars, and coacting means on said valve and bars for utilizing the rotation of said valve to outwardly force said bars against said valve casing thereby causing said bars to expand said rings against the casing.

2. In an assemblage of the class described, a cylindrical valve casing, a rotary valve in said casing, two expansible packing rings surrounding said valve, and at least two circumferentially spaced longitudinal packing bars extending between and secured at their ends to said packing rings, said valve having circumferential and longitudinal grooves receiving said rings and bars respectively, at least the trailing sides of said bars and longitudinal grooves being oblique to radial lines extending through said bars, the obliqueness of said oblique bar and groove sides being in a direction to cause them to outwardly force said bars against the valve casing thereby causing said bars to expand said rings against the casing.

3. A rotary valve packing comprising two expansible axially alined packing rings, and at least two circumferentially spaced longitudinal packing bars extending between and secured to said rings, said bars having expansion-effecting means for coaction with portions of the valve on which the packing is used to utilize the rotation of said valve for forcing the bars outwardly, thereby causing said bars to expand said rings.

4. A rotary valve packing comprising two expansible axially alined packing rings, and at least two circumferentially spaced longitudinal packing bars extending between and secured to said rings, said bars having oblique trailing sides for coaction with portions of the valve on which the packing is used to utilize the rotation of said valve for forcing the bars outwardly, thereby causing said bars to expand said rings.

CHARLES H. SEIFERT.